United States Patent [19]

Rydmann

[11] Patent Number: 4,657,502
[45] Date of Patent: Apr. 14, 1987

[54] APPARATUS FOR MANUFACTURING HOLLOW BODIES FROM THERMOPLASTIC SYNTHETIC RESINOUS MATERIALS

[75] Inventor: Theo Rydmann, Hettenleidelheim, Fed. Rep. of Germany

[73] Assignee: C.F. Spiess & Sohn Kunststoffwerk GmbH & Co., Fed. Rep. of Germany

[21] Appl. No.: 601,671

[22] Filed: Apr. 18, 1984

[30] Foreign Application Priority Data

Apr. 19, 1983 [DE] Fed. Rep. of Germany ....... 3314106

[51] Int. Cl.⁴ ............................................. B29C 49/10
[52] U.S. Cl. .................................. 425/526; 264/531; 264/532; 425/529; 425/530; 425/534
[58] Field of Search .............. 425/522, 526, 529, 530, 425/534, 547; 264/531, 532, 534; 156/86

[56] References Cited

U.S. PATENT DOCUMENTS

| 3,277,223 | 10/1966 | Curto . | |
|---|---|---|---|
| 3,278,665 | 10/1966 | Harrison | 264/534 |
| 4,063,867 | 12/1977 | Janniere | 425/530 |
| 4,105,391 | 8/1978 | Aoki | 425/526 |
| 4,416,714 | 11/1983 | Hoffman | 156/86 |

FOREIGN PATENT DOCUMENTS 1816489  3/1972  Fed. Rep. of Germany .

Primary Examiner—Jay H. Woo
Assistant Examiner—Timothy W. Heitbrink
Attorney, Agent, or Firm—Barnes & Thornburg

[57] ABSTRACT

A method for manufacturing hollow bodies from thermoplastic material by making hollow body-shaped preforms provided with opening nipples, which during a subsequent processing operation are reduced to the final shape after converting at least a part of their wall into deformable condition, whereby the forming-out takes place in at least two stages.

20 Claims, 5 Drawing Figures

APPARATUS FOR MANUFACTURING HOLLOW BODIES FROM THERMOPLASTIC SYNTHETIC RESINOUS MATERIALS

The present invention relates to a method and apparatus for manufacturing hollow bodies from thermoplastic synthetic resinous materials by making hollow body-shaped preforms provided with an opening connection or nipple which are formed-out into the final shape of the hollow bodies to be manufactured in a subsequent manufacturing step after reducing at least a part of their wall into deformable condition.

It is known as a rational and cost-saving method and also introduced in some cases in practice that packagings of plastic material primarily of PVC or PET (for example, beverage bottles) are brought by means as simple as possible into the final shape during processing, for example, at the filler, from preforms supplied by the manufacturer and are thereafter immediately filled and closed. This method is more economical than those used heretofore because by the use of a preform, the waste can be avoided which occurs naturally with the conventional single-step extrusion blowing process. Additionally, the manufacture of a preform is less problematical and more economical than the free extruding of a hose which leaves the extruder freely suspended and is very sensitive as regards the walls. With this known two-stage method, a preform is manufactured by the manufacturer, which compared to the final hollow body, has a strongly reduced volume but already possesses the final dimensions preferably in its neck area whereas the lower neck area and the main body are not yet formed-out and are preferably cylindrically shaped thereat. As a result of their considerably smaller volume, the preforms can be stored and transported more readily than finished formed-out hollow bodies. These preforms are then again brought into deformable, preferably thermoplastic, condition by known means at the further processor (for example, at the filler) and are finally formed-out.

Up to now, it has been possible to manufacture and further process in this manner only hollow bodies with far-reachingly axially symmetrical form such as, for example, round bottles for beverages. Hollow bodies of other particularly interesting constructions, such as wide-bellowed handle-bottles or canisters cannot be manufactured in this manner because the preform according to the prior art methods and the processing machines known heretofore permits only a small processing latitude as regards spatial dimensions and deformation.

Accordingly, it is an object of the present invention to provide in contrast thereto a method and apparatus which permit to form-out hollow bodies, respectively, containers of any form, also of complicated shape, from preforms while at the same time maintaining all of the aforementioned advantages of the known two-stage method.

The underlying problems are solved according to the present invention in that the forming-out into the final shape is carried out in at least two steps, and more particularly in an intermediate forming stage and in at least one final forming stage, whereby each preform far-reachingly is approximated during the intermediate forming operation to the configuration of the finished hollow body and the desired contours are produced in the hollow body walls during the final forming operation. The at least two-step forming-out operations according to the present invention can be carried out in a continuous operation particularly favorable for the manufacture of mass-produced articles. It does not require any specially trained personnel and can thus be carried out without difficulties at the further processor (for example, at the filler) in a special, but relatively simple, machine. The preforms are received in this machine, are heated and are preformed in a special station prior to the final forming-out operation in order to impart to the hollow body already prior to reaching the final shape or form a spatial form or shape which corresponds already approximately to the final shape.

This can be achieved preferably in that the preform which has already been heated by conventional means and brought into a thermo-elastic condition, is brought to a preliminary blowing station. It is thereby achieved by a controlled metering of supporting air with the assistance of auxiliary heat sources (for example, heat radiators) and a corresponding shading of certain areas of the preform that a bodily shape is imparted to the preform which far-reachingly corresponds to the final configuration of the finished article.

If hollow bodies, for example, containers with particularly difficult forms or shapes, for example, with unilateral expansions or enlargements with respect to the center axis thereof are to be manufactured, then the intermediate forming operation may take place under a mechanical spreading or expanding action exerted from the inside of the preform in the longitudinal or transverse direction in conjunction with the heat supply within limited areas to the preform wall. This spreading or expanding action can be exerted at the same time and in conjunction with the inflating or blowing operation. As a result thereof, the wall thickness is not only intentionally matched during the final forming operation to subsequent stressing, but by alignment of the molecules an additional strength and rigidity is achieved therebeyond. Preferably, this spreading or expanding action will be exerted up to the beginning of the final shaping or forming operation.

The now partially formed preform formed in the intermediate forming operation according to the present invention or intermediate preform is then subjected in a forming tool to final forming. This final forming may include preferably a blow-molding operation by means of a blow-molding tool determining the contours of the finished hollow body. However, it may also include a forming by vacuum in a mold determining the final contours.

The preforms may be made preferably by injection molding. By means of such injection molding, the preform walls can be constructed in all areas very accurately with predetermined wall thickness. The preforms can be brought thereby beforehand to the wall thickness conditions necessary or appropriate during the intermediate forming and final forming operations.

The preforms can be so constructed that their opening connection or nipple is—at least far-reachingly—already identical in its form to the opening connection or nipple of the finished hollow body. The advantages of the injection molding process as regards form-accuracy and dimensional accuracy are thereby fully utilized for the construction and formation of the opening connection or nipple. Additionally, the already finished formed opening connection or nipple offers particular advantages for the admittance of the expanding device as well as the feed and maintenance of the support air during the intermediate forming operation and for the supply and maintenance of the compressed air during the final forming operation. The method according to the present invention may be carried out without difficulty with preforms of conventional configuration, i.e., essentially cylindrical preform walls. However, it has also been found within the scope of the present invention that it is possible without any difficulty to so construct the preforms in their formed-out part that they taper conically thereat from the opening connection or nipple and have a smaller cross section than at the opening connection or nipple. Such preforms can be stacked space-savingly into rods (stacking or nesting) and offer thereby particularly advantages during storage and transportation.

For carrying out the method according to the present invention, an apparatus for forming-out hollow body-shaped preforms provided with opening connections or nipples into finished formed bodies may be provided which are characterized in that a preheating stage, an intermediate forming stage and a deforming station, properly speaking, are arranged one behind the other in the transporting direction along a transporting path for the preforms, whereby the preheating stage includes heating devices which are constructed and controlled, respectively, controllable for heating up the preforms over their entire part to be formed-out to a temperature within the thermo-elastic range of the material to be deformed whereas in the intermediate forming stage, heat radiators and shading elements for the additional heating of limited areas of the preform walls as well as nozzle arrangements for the introduction of supporting air in controlled metered amounts into the interior of each preform, respectively, intermediate preform are provided.

In order to keep uniform the limited area in which the preform wall is additionally heated, during the entire intermediate forming step, it is recommended according to the present invention to mount the heat radiators and/or the shading elements together with the preforms, respectively, intermediate preforms so as to travel in unison in the intermediate preform stage.

The deforming station, properly speaking, may be equipped with blow-molding installations of essentially known type.

In order to enable to the preforms and intermediate preforms an expansion which is as unimpaired as possible during the intermediate forming operation, it is recommended that the transporting or conveying installation provided in the transporting stage is constructed for the vertical suspension of the preforms, respectively, intermediate preforms, respectively, finished hollow bodies.

The apparatus according to the present invention may also be equipped with additional devices for the mechanical spreading or expanding if hollow bodies of particularly difficult shape are to be made. For that purpose, expanding mandrels may be provided in the intermediate forming stage which are adapted to be inserted into the interior of the preforms through opening nipples and which move in unison with the preforms through the intermediate forming stage. Such expanding mandrels may include laterally expandable spreading or expanding elements engaging the inside of the preform walls, which elements are connected to an actuating mechanism axially movable with respect to the corresponding expanding mandrel. The expanding mandrels may also be constructed according to the flex-ball principle.

If the apparatus in accordance with the present invention is equipped with such expanding mandrels, then a guide and control installation for the expanding mandrel is recommended according to the present invention which extends up to within the area of the deformation station and which is then so constructed that the respective expanding mandrel is retracted only when the forming work tool receiving the intermediate preform is almost closed. It is achieved thereby that the intermediate preform is kept in the expanded condition by means of the spread expanding elements of the expanding mandrel for such length of time until the final shaping starts in the forming work tool. The collapse of the intermediate preform and also non-defined deformations at the intermediate preform can be precluded thereby which might prevent or render difficult the introduction of the intermediate preform into the forming work tool and the closing of the forming work tool about the intermediate preform.

In order to be able to carry out in a particular simple and reliable manner the mechanical expanding action and the inflation during the intermediate forming operation, it is appropriate if each expanding mandrel together with a nozzle arrangement for the introduction of support air is mounted at the guide and control installation.

These and other objects, features and advantages of the present invention will become more apparent from the following description when taken in connection with the accompanying drawing which shows, for purposes of illustration only, several embodiments in accordance with the present invention and wherein.

Figure 1:
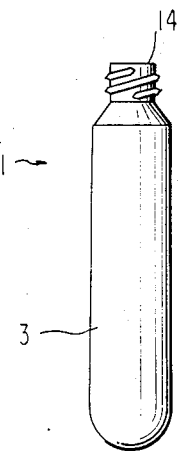
FIG. 1 is a side elevational view of a first embodiment of a preform in accordance with the present invention.

Referring now to the drawing wherein like reference numerals are used throughout the various views to designate like parts, and more particularly to FIG. 1, this figure illustrates a preform as can be manufactured by conventional means with the injection-molding method. The preform includes an opening nipple 14 which is constructed already in the final shape of the opening nipple for the hollow body to be manufactured. The preform wall 3 to be formed-out is constructed essentially cylindrically in the embodiment of FIG. 1.

Figure 2:
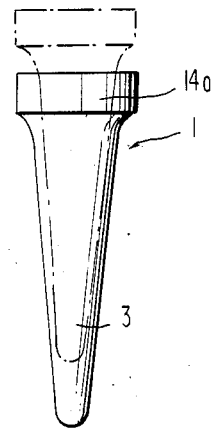
FIG. 2 is a side elevational view of a second embodiment of a preform in accordance with the present invention, with a stacked preform indicated in dash and dotted lines.

FIG. 2 illustrates a modified embodiment of the preform 1. In this embodiment, the preform wall to be formed-out tapers conically from the opening nipple 14a and has an overall smaller cross section than the opening cross section of the opening nipple 14a. As a result thereof such preforms can be assembled into rods as indicated in dash and dotted lines—for example, by stacking or nesting. The opening nipple 14a may possess already the dimensions and shape of the opening nipple in the finished hollow body. However, it is also possible to subsequently reform the opening nipple 14a into the desired final contour during the final forming operation.

Figure 3:
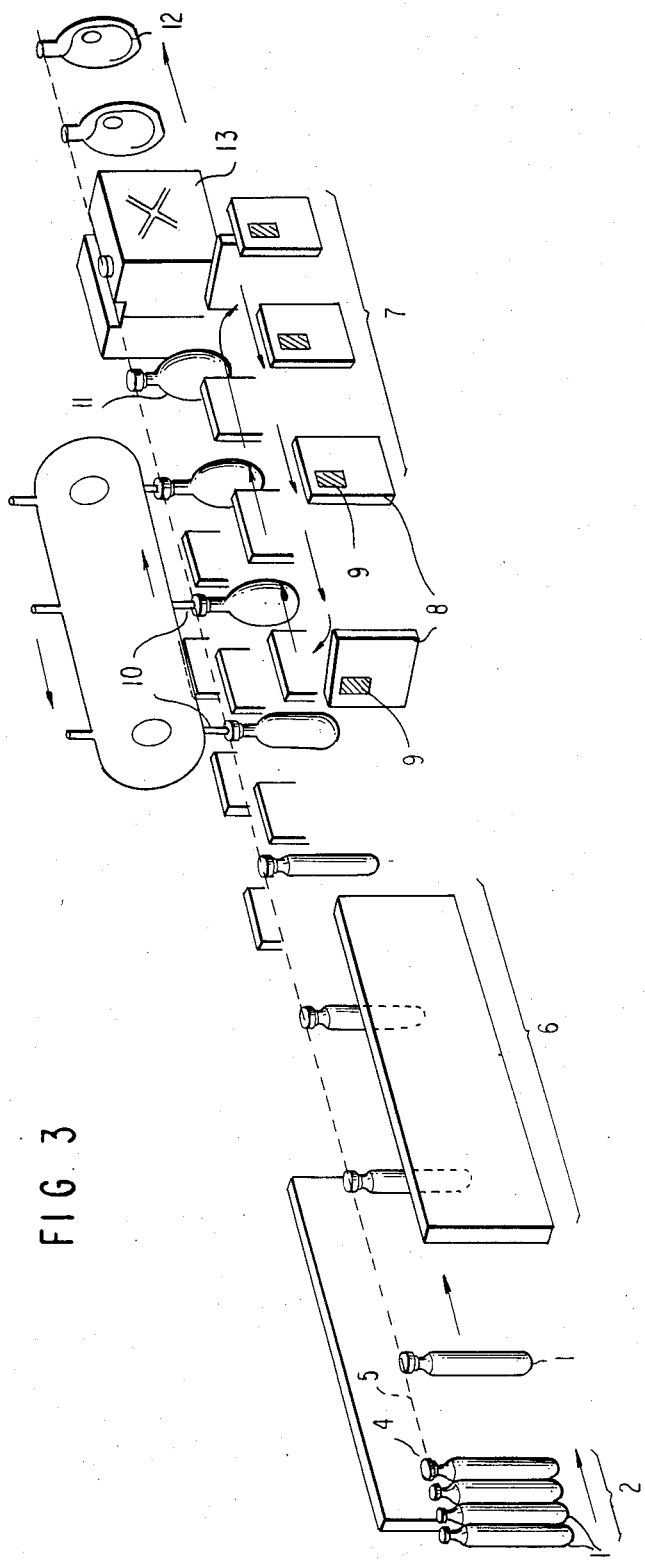
FIG. 3 is a schematic perspective view of one embodiment of a further processing machine in accordance with the present invention.
Figure 4:
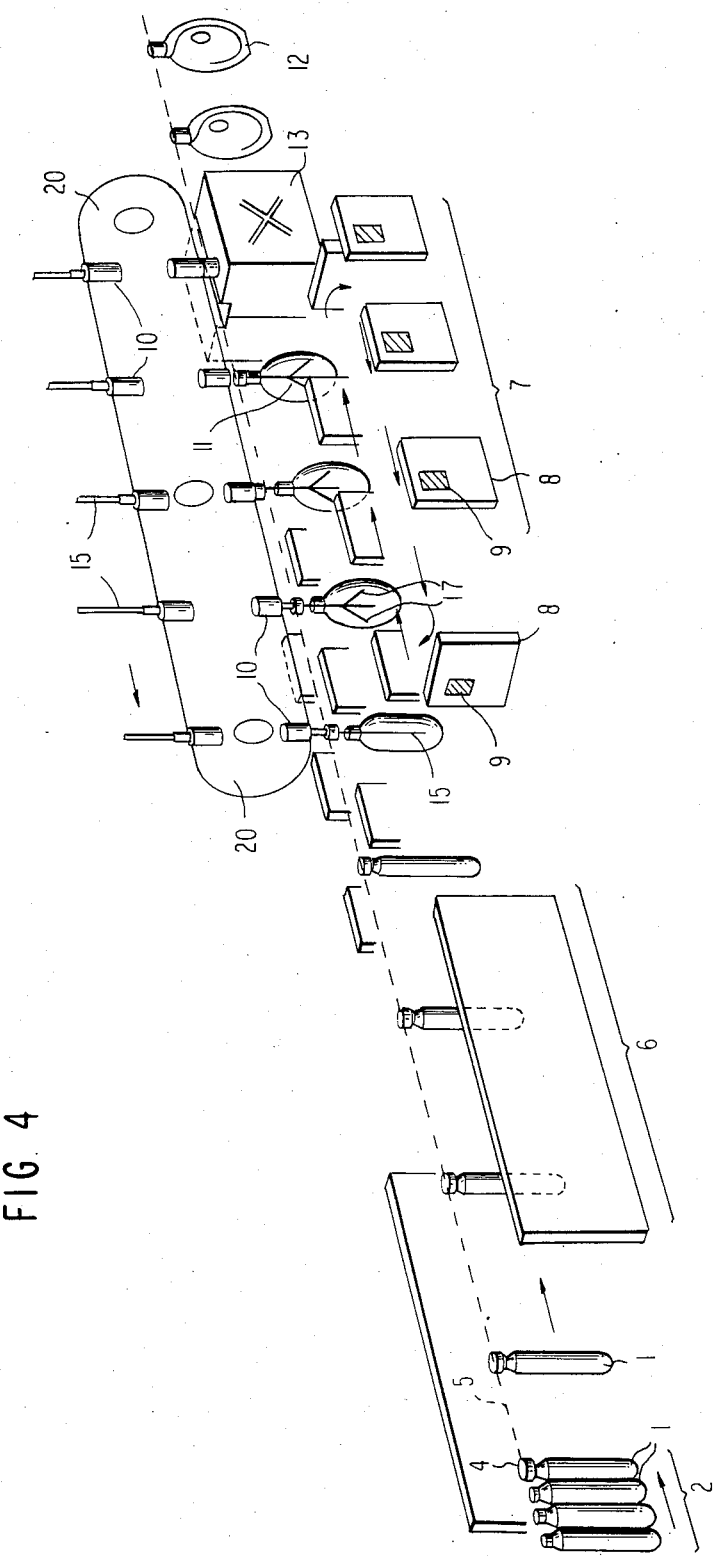
FIG. 4 is a schematic perspective view of a second embodiment of a further processing machine in accordance with the present invention.

For the further processing in a further processing machine according to FIG. 3, as well as in a further processing machine according to FIG. 4, the preforms 1 are at first inserted into a magazine 2. Each individual preform 1 is automatically guided from this magazine 2 to a pick-up device 4. These pick-up devices 4, each seizing a preform, are secured on a transporting or conveying installation 5 and are so constructed that the respective preform 1 is freely suspended thereon. The preforms 1 thus suspended at the pick-up devices 4 now pass through a preheating stage 6 and are thereby brought to a temperature which lies in the thermo-elastic range of the material to be deformed.

An intermediate forming stage 7 adjoins the preheating stage 6. The still freely suspended preforms 1 are continued to be partially heated thereat, for example, by means of infrared radiators 8 travelling along. Furthermore, shading elements 9 which travel along, are provided which exclude or shade areas of the preform wall from the heating action of the infrared radiators 8. A predetermined temperature pattern or temperature profile is produced therewith on the preform wall.

At the same time supporting air in controlled quantity and with controlled pressure is introduced into the interior of each preform 1 by means of a nozzle arrangement 10 guided to the opening nipples 14, 14a. As a result of the action of the supporting air, the preform wall will expand, and more particularly, dependent on the temperature pattern, respectively, temperature profile produced on the preform wall. This non-uniform expansion of the preform wall leads to a resulting intermediate preform 11 whose form and shape corresponds far-reachingly to the final form or shape of the hollow body to be manufactured. In order to assure useful wall thickness conditions in the hollow bodies to be manufactured, the preforms 1 may be constructed already with larger wall thickness in those parts of its walls to be formed-out which are expanded more strongly during the intermediate forming-out operation.

As illustrated in FIG. 4, with the construction of more difficult shapes, for example, with a one-sided expansion from the center axis, additionally a mechanical spreading or expanding at the preform wall may be undertaken. For that purpose, provision is made in the application illustrated in FIGS. 4 and 5 to slip an expanding mandrel 15 in a controlled manner into the interior of the preform 1 through the opening nipple 14 of the preform 1 while passing through the intermediate forming stage 7. This expanding mandrel 15 carries laterally spreadable expanding elements 17 which are displaced by means of an actuating device movable axially to the respective expanding mandrel 17. The spreading or expanding elements 17 thereby abut against the inside of the preform walls and expand the same non-uniformly under mechanical interaction.

Figure 5:
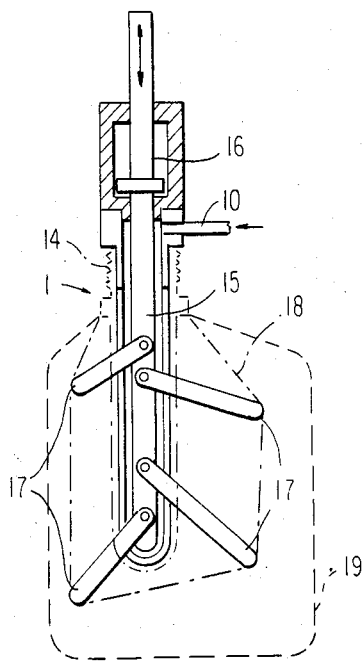
FIG. 5 is a schematic axial cross-sectional view through an expanding mandrel with nozzle arrangement for suporting air in accordance with the present invention.

The forming mandrel 15 is—as shown in FIG. 5—surrounded by a nozzle arrangement 10 for supporting air so that simultaneously with the exerted spreading or expanding action also a controlled inflation of the preform wall takes place additionally until the preform, respectively, intermediate preform has a contour 18.

The intermediate preform is guided together with the spreading or expanding elements 17 up to within the forming area of the subsequent final deformation station 13 and is introduced thereat into the respective forming work tool. Only when the forming work tool of this station is nearly closed, the spreading or expanding elements 17 are again retracted.

In both embodiments of FIGS. 4 and 5, the deformation station 13, properly speaking, adjoins the intermediate deformation section 7. The deformation station 13 may include a blow-molding installation or vacuum-molding installations of known type. However, in every case forming or molding work tools are provided, which determine the final contours 19 of the hollow bodies 12 to be manufactured. If the hollow body becomes sufficiently rigidified in the forming or molding work tool, the forming mandrel 5 and the nozzle arrangement 10 are—as shown in FIG. 4—retracted out of the opening nipple of the respective hollow body 12 by means of a guide and control installation 20 and are transported back to the beginning of the intermediate forming section 7. Also, the infrared radiators 8 and shielding elements 9 which travel together with the preforms 1, respectively, intermediate preforms 11, move on endless tracks from the end of the intermediate preform section 7 back to the starting position thereof. During the final forming or molding operation, the wall is then formed-out into the contour 19 of the finished hollow body 12 as shown in dashed lines in FIG. 5.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An apparatus for forming-out hollow-body-shaped preforms having interior walls and made of a material to be deformed, said preforms being provided with an opening connection for producing finished hollow bodies, said apparatus comprising a preheating stage, an intermediate forming stage and a final deformation station, arranged one behind another along a transporting means, the preheating stage including controllable heating means for heating the preforms over their entire part to be formed-out to a temperature within a thermo-elastic range of the material to be deformed, the intermediate forming stage including heat-radiating means and shading means for additional heating of limited areas of the preform walls and nozzle means for introducing supporting air in controlled quantities into the opening connection, the heat-radiating means and shading means being mounted in the intermediate stage to travel together with the preforms.

2. An apparatus according to claim 1, wherein the deformation station, includes blow-molding means.

3. An apparatus according to claim 2, wherein the transporting means includes means for vertical suspension of the preforms and the finished hollow bodies.

4. An apparatus according to claim 3, wherein the intermediate stage includes expanding means operable to be inserted through the opening connection into the interior of the preforms and travelling together with the preforms through the intermediate stage.

5. An apparatus according to claim 4, wherein the expanding means includes laterally spreadable expanding elements engaging the interior preform walls, and actuating means connected with said expanding elements and said actuating means being movable axially to the expanding means.

6. An apparatus according to claim 5, further comprising guide and control means for the expanding means which extend up to within an area of the deformation station and are so constructed as to retract the expanding means only when a shaping work-tool means accommodating a preform is nearly closed.

7. An apparatus according to claim 6, wherein each expanding means together with a nozzle means is mounted at the guide and control means for introducting supporting air.

8. An apparatus according to claim 1, wherein the deformation station includes blow-molding means.

9. An apparatus according to claim 1, wherein the transporting means includes means for vertical suspension of the preforms and the finished hollow bodies.

10. An apparatus according to claim 1, wherein the intermediate stage includes expanding means operable to be inserted through the opening connection into the interior of the preforms and travelling together with the preforms through the intermediate stage.

11. An apparatus according to claim 10, wherein the expanding means includes laterally spreadable expanding elements engaging the interior preform walls, and actuating means connected with said expanding elements and said actuating means being movable axially to the expanding means.

12. An apparatus according to claim 10, further comprising guide and control means for the expanding means which extend up to within an area of the deformation station and are so constructed as to retract the expanding means only when a shaping work-tool means accommodating a preform is nearly closed.

13. An apparatus according to claim 12, wherein each expanding means together with a nozzle means is mounted at the guide and control means for introduction supporting air.

14. An apparatus for manufacturing hollow bodies from preforms of thermoplastic materials, each preform having an interior wall and an opening connection, said apparatus comprising transporting means for transporting the preforms, preheating means for preheating said preforms, end-station forming means for final forming of said preforms into the hollow bodies, while arranged on mandrel means, and intermediate forming means between said preheating means and said end-station forming means, said intermediate forming means including predetermined heat-radiating means for additional heating of said preforms within only limited areas thereof, said mandrel means having laterally spreadable elements operable to engage the interior preform walls to impart a predetermined shape to said preforms while under the influence of said predetermined heat-radiating means.

15. An apparatus according to claim 14, wherein the end-station forming means is constructed as a blow-molding station and the mandrel means are constructed as blow-mandrels.

16. An apparatus according to claim 14, wherein the end-station means is constructed as a vacuum station and the mandrel means are constructed as mandrels for introducing a fluid supporting medium.

17. An apparatus according to claim 14, wherein said heat-radiating means travel along with said preforms to said transporting means.

18. An apparatus according to claim 14, wherein each mandrel means includes actuating means movable axially relative to the mandrel means for causing the laterally spreadable elements to spread into engagement with the interior preform walls.

19. An apparatus according to claim 14, wherein the end-station forming means is constructed as a blow-molding station and the mandrel means are constructed as blow-mandrels.

20. An apparatus according to claim 14, wherein the end-station means is constructed as a vacuum station and the mandrel means as mandrels for introducing a fluid supporting medium.

* * * * *